United States Patent

Nakamura et al.

[11] Patent Number: 6,034,452
[45] Date of Patent: Mar. 7, 2000

[54] RECTIFIER ARRANGEMENT OF ALTERNATOR FOR VEHICLE

[75] Inventors: Shigenobu Nakamura, Anjo; Tsutomu Shiga, Nukata-gun; Koichi Ihata, Okazaki, all of Japan

[73] Assignee: Denso Corporation, Kariya, Japan

[21] Appl. No.: 09/140,414

[22] Filed: Aug. 26, 1998

[30] Foreign Application Priority Data

Nov. 27, 1997 [JP] Japan .................................... 9-325906

[51] Int. Cl.[7] .................................................. H02K 19/36
[52] U.S. Cl. ............................ 310/68 D; 310/43; 310/64
[58] Field of Search .................................. 310/68 D, 62, 310/63, 64, 43; 363/141, 145

[56] References Cited

U.S. PATENT DOCUMENTS

| | | | |
|---|---|---|---|
| 3,295,046 | 12/1966 | Margaira | 310/68 D |
| 4,543,504 | 9/1985 | Iwaki et al. | 310/68 D |
| 4,720,645 | 1/1988 | Stroud et al. | 310/68 D |
| 4,841,182 | 6/1989 | Tsuchiya et al. | 310/68 D |
| 4,843,267 | 6/1989 | Kaneyuki | 310/68 D |
| 5,331,231 | 7/1994 | Koplin et al. | 310/68 D |
| 5,710,467 | 1/1998 | Irie et al. | 310/64 |

FOREIGN PATENT DOCUMENTS

| | | | |
|---|---|---|---|
| 55-10871 | 1/1980 | Japan | 310/68 D |

*Primary Examiner*—Nestor Ramirez
*Assistant Examiner*—Burt Mullins
*Attorney, Agent, or Firm*—Pillsbury Madison & Sutro, LLP

[57] ABSTRACT

A rectifier arrangement of an alternator for a vehicle includes a frame and a cover for a rectifier. The rectifier arrangement is composed of a plus-potential cooling-fin disposed in a space between the cover and the frame at a portion close to the cover in parallel therewith, a minus-potential cooling-fin disposed in the space in parallel with the plus-potential cooling-fin, a fastening member fixed to the frame and extending through mounting holes of the plus-potential and minus-potential cooling fins, a cylindrical bushing made of thermosetting resin disposed in a space formed by the cover, plus-potential cooling-fin and fastening member.

8 Claims, 5 Drawing Sheets

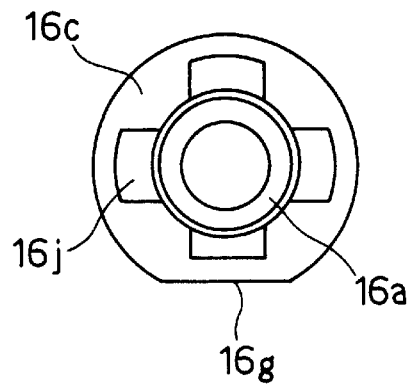
FIG. 8
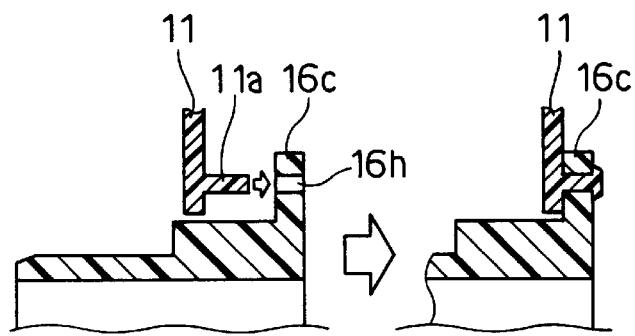
FIG. 9
FIG. 10A
FIG. 10B
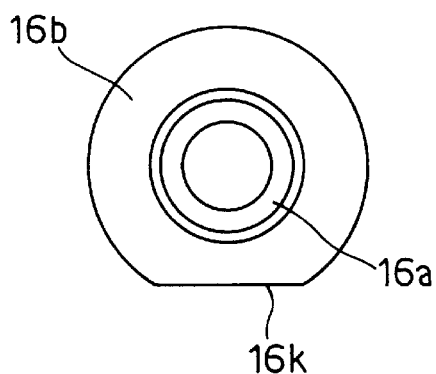
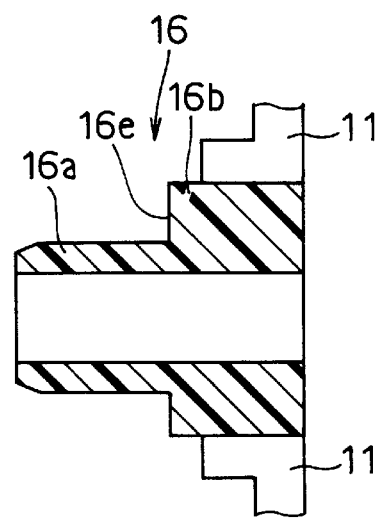

RECTIFIER ARRANGEMENT OF ALTERNATOR FOR VEHICLE

BACKGROUND OF THE INVENTION

1. Field of the Invention

The present invention relates to a rectifier arrangement of an alternator to be mounted in a passenger car, a truck or the like.

2. Description of the Related Art

In order to reduce vehicle running resistance and to increase space provided in the passenger compartment, engine compartments have been reduced in size. Accordingly, temperature in the engine compartment and of an electric device such as an alternator has become higher. Moreover, as a vehicle has been equipped with various safety devices, the output power of the alternator has increased. This has narrowed the space of the engine compartment. Thus, it is necessary to provide an alternator that generates higher power without increasing its size.

On the other hand, as the engine has become more powerful and compact, vibration of the engine has increased. Thus, such a vehicle requires a compact, powerful, temperature resistant, vibration resistant and inexpensive alternator.

FIG. 12 illustrates a portion of a conventional alternator having an ordinary rectifier disposed in a space S between frame 100 and metal cover 101. The rectifier is composed of terminal plate 104, plus potential cooling fin 105 (hereinafter referred to as plus fin), bushing 106 and minus potential cooling fin 107 (hereinafter referred to as minus fin). Pipe rivet 103 fastens terminal plate 104, plus fin 105, bushing 106 and minus fin 107 in this order. Plus fin 105 has plus rectifier elements (not shown), and minus fin 107 has minus rectifier elements. The rectifier elements are fixed to fins 105, 107 respectively by soldering or press-fitting. Metal terminal 110 is molded integrally with terminal plate 104 to form a rectifier circuit and is connected to lead 109 which extends from a stator winding at one end and to one of the rectifier elements at the other end. Terminal plate 104 is molded with a thermoplastic resin such as polyphenylene sulfide. Bushing 106 is disposed between two fins 105, 107. Bushing 106 is made of an inexpensive thermosetting resin such as a phenolic resin because bushing 106 is not required to be molded with a metal member and is simple in shape. The rectifier is fixed to frame 100 together with cover 101 by a bolt 102 that is press-fitted to frame 100 and nut 108. Bolt 102 is inserted into pipe rivet 103 and a mounting hole of cover 101. Thus, plus fin 105 is spaced apart from minus fin 107, frame 100, bolt 102 and cover 101, which are fixed together.

When ambient temperature and temperature of rectifier in high power operation are high, creep—a gradual increase in strain due to viscoelasticity of the resin—may take place on thermoplastic terminal plate 104, resulting in that the resinous member shrinks in the direction to loosen nut 108. This reduces the fastening force of the rectifier, thereby causing breakdown of the rectifier elements and leads 109 of the stator winding.

JP-A-6-133509 proposes an improved structure, in which minus rectifier element is press-fitted to the frame, thereby omitting a minus fin. A bushing is made of thermoplastic resin such as polyphenylene sulfide to have a rectifier-forming metal terminal molded together.

Because the axial length of the bushing around the nut is comparatively thick, the strain increases due to the creep to loosen the nut. Because the minus rectifier element is fixed to the frame, cooling air windows can not be formed to be wide enough to cool the plus fin. This accelerates the creep further. The bushing must be provided for each engagement hole to enclose and insulate the plus fin completely. Moreover, because of complexity in shape, tooling and manufacturing costs increase. Further, polyphenylene sulfide is generally expensive, thereby increasing material costs.

SUMMARY OF THE INVENTION

A main object of the invention is to solve the above-described problems and to provide an inexpensive, heat resistant and vibration resistant alternator for a vehicle.

According to a main aspect of the invention, a rectifier arrangement of a vehicle alternator is provided. A plus-potential cooling-fin is disposed in a space inside the alternator at a portion close to the cover. A minus-potential cooling-fin is disposed in contact with the frame inside the alternator, and is in parallel with the plus-potential cooling-fin. A fastening member is fixed to the frame and extends through mounting holes of the cover, and of the plus-potential and minus-potential cooling fins. A cylindrical bushing made of thermosetting resin is disposed in a space formed by the cover, the plus-potential cooling-fin and the fastening member.

Because the bushing made of thermosetting resin, such as phenol resin, is resistant to creep, loosening of the bolt can be prevented under high ambient temperature, thereby enhancing vibration resistance. Moreover, phenol resin is inexpensive and can be fixed to the cover easily so that assembling work can be simplified and production costs can be reduced.

According to another aspect of the invention, the bushing of the rectifier arrangement has a flange having a surface in contact with the plus-potential cooling-fin. When the rectifier is fastened via the bushing, the plus fin can be insulated and the creep is prevented.

According to another aspect of the invention, the cover of the rectifier arrangement is made of thermoplastic resin, and the bushing is integral with the cover.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 8 is a front view of a bushing of a rectifier arrangement according to a second embodiment of the invention;

FIG. 9 is a schematic cross-sectional view for explaining a method of fixing the bushing and cover of a rectifier arrangement according to a third embodiment;

FIG. 10A is a front view illustrating a bushing of a rectifier arrangement according to a fourth embodiment, and FIG. 10B is a cross-sectional view thereof;

DETAILED DESCRIPTION OF THE PREFERRED EMBODIMENTS

First Embodiment

Figure 1:
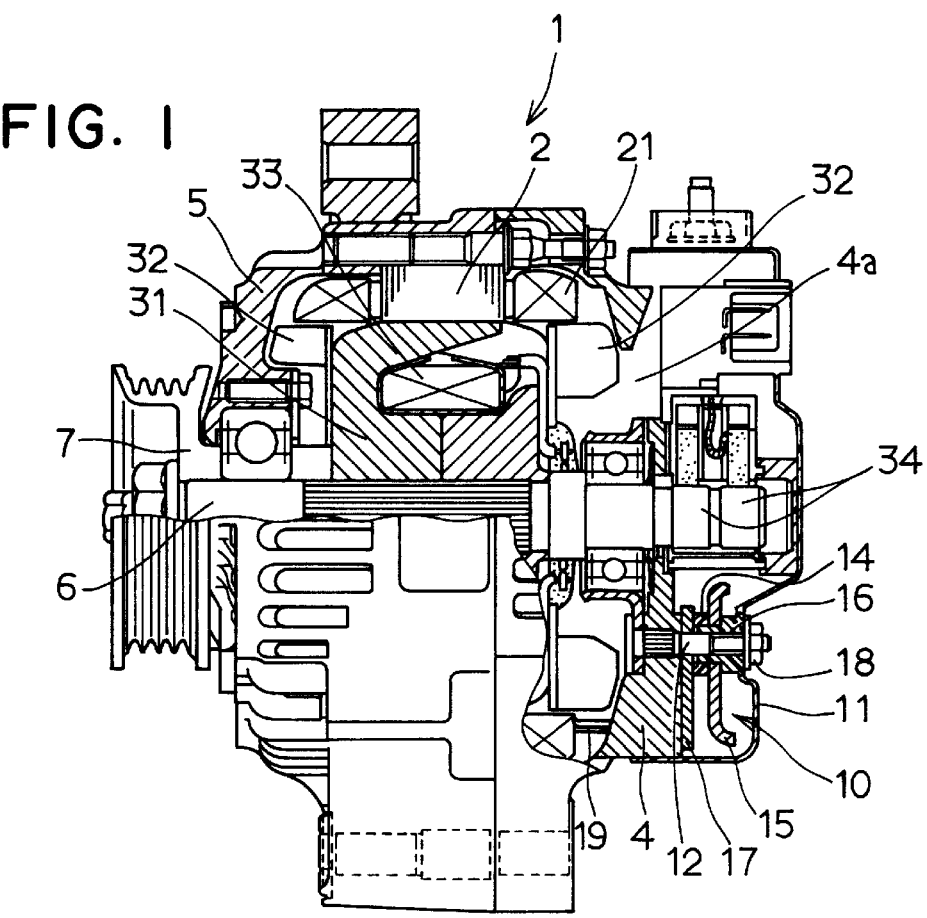
FIG. 1 is a cross-sectional view of a main portion of an alternator for a vehicle having a rectifier arrangement according to a first embodiment of the invention.

A rectifier arrangement according to a first embodiment of the present invention is described with reference to FIGS. 1–4.

Alternator 1 to be mounted in a vehicle has stator 2, rotor 3, rear and front frames 4, 5 for supporting the rotor and stator. Rotor 3 rotates together with shaft 6 and has a pair of pole cores 31, cooling fans 32, a field coil 33 and slip rings 34. Alternator 1 is driven by an engine (not shown) mounted in a vehicle through shaft 6 and pulley 7 connected to shaft 7. When field coil 33 is energized through slip rings 34, ac power is generated in stator coil 21 and is supplied to full-wave rectifier 10 through lead wires 19 to be converted into dc power.

Full-wave three-phase rectifier 10 is a bridge circuit composed of three or four pairs of plus and minus elements and cooling fins 15, 17. Minus fin 17 is disposed to be in contact with a portion of rear frame 4. Plus fin 15 is disposed on the side of cover 11 in parallel with minus fin 17. Terminal plate 14 has metal terminals insert-molded therein and is interposed between plus and minus fins 15, 17 to insulate the same. The metal terminals are connected to lead wires 19 of stator coil 21 and terminals of the rectifier elements to form a portion of the bridge circuit. All the metal terminals of terminal plate 14 are molded together with thermoplastic resin such as polypheylene sulfide that is good in moldability, size-accuracy, heat resistance, weather resistance and dielectric strength. Rear frame 4 has cooling air windows 4a at portions (not shown) spaced apart from rear frame 4.

Figure 2:
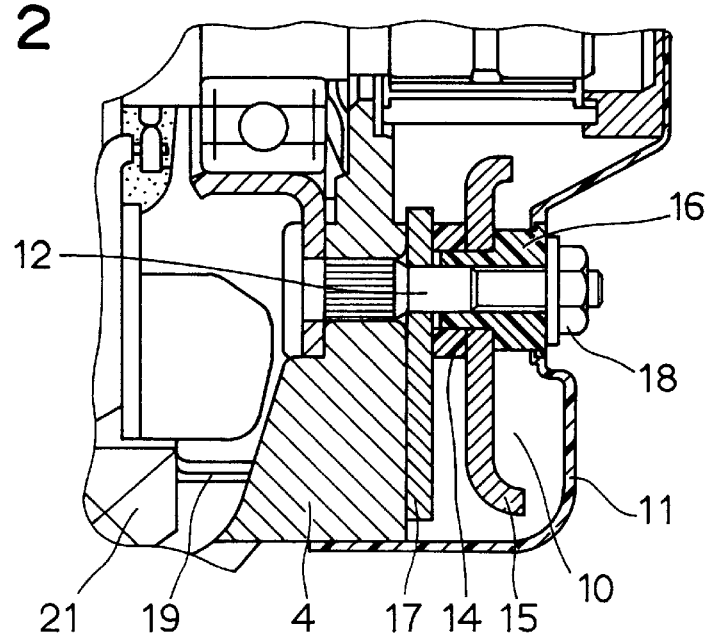
FIG. 2 is a cross-sectional view of portions around the rectifier arrangement according to the first embodiment.
Figure 3:
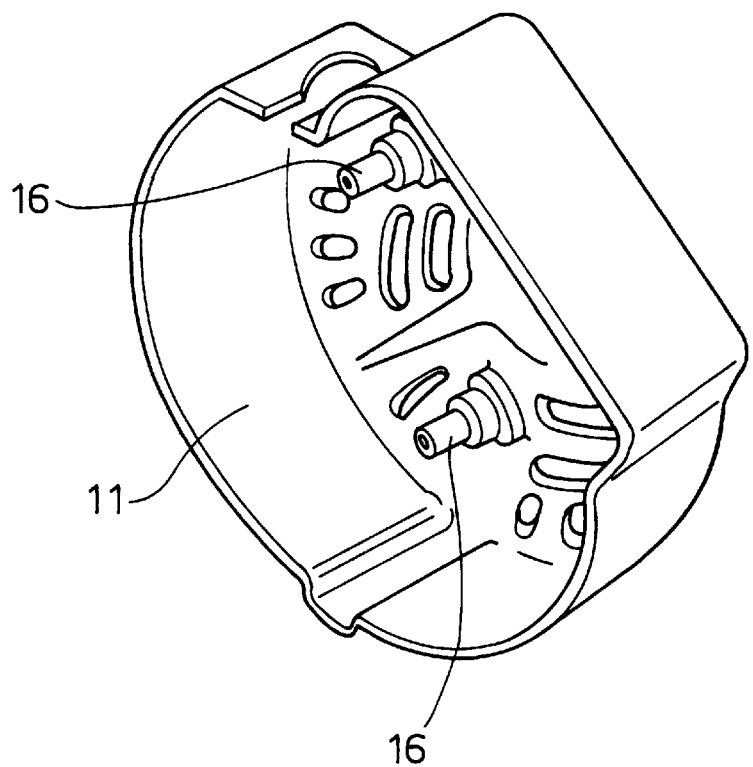
FIG. 3 is a perspective view of the cover with bushings being fixed thereto.
Figure 4A:
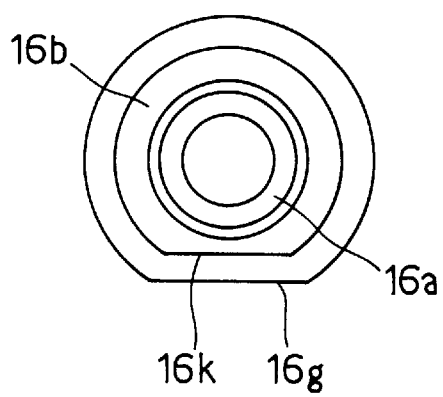
FIG. 4A is a front view illustrating a bushing in the rectifier arrangement according to the first embodiment.
Figure 4B:
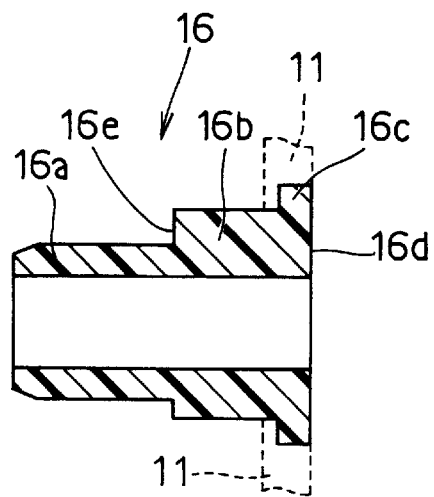
FIG. 4B is a cross-sectional view thereof.

Cover 11, plus and minus fins 15, 17 and terminal plate 14 respectively have three mounting holes (only one is shown in FIG. 1) formed in the corresponding portions thereof to be mounted to frame 4 so that rectifier 10 can be fixed by bolts 12. Bolts 12 are press-fitted to rear frame 4 at one end. Then, the mounting holes of cover 11 are respectively fitted to bolts 12 and fastened by nuts 18 from outside in the axial direction. Cover 11 is made of inexpensive thermoplastic resin such as nylon. A plurality of bushings 16 are molded in cover 11 to extend toward rear frame 4 as shown in FIG. 3. Each of bushings 16 has a cylindrical portion interposed between bolt 12 and the inner periphery of the mounting hole of plus fin 15 and terminal plate 14 as shown in FIG. 2. Bushings 16 are made of thermosetting resin such as phenol resin and formed as shown in FIGS. 4A and 4B. Bushing 16 also has an inner flange 16b that is larger in outside diameter than the inside diameter of the mounting hole of plus fin 15 and an outer flange 16c that has outside surface 16d for nut 18 to be seated thereon. When nut 18 is fastened, end surface 16e of inner flange 16b presses plus fin 15 in the axial direction to fix plus fin 15, terminal plate 14 and minus plate 17 to rear frame 4. Because the end surface of inner flange 16b abuts on plus fin 15, the end surface of bushing 16 is spaced apart from minus fin 17 as shown in FIG. 2. Straight cut portions 16g, 16k are formed on the outer periphery of outer and inner flanges 16c, 16b so that bushing 16 can be prevented from rotating when nut 18 is screwed up. Outer flange 16c has a contact surface area larger than contact surface area of nut 18.

As described above, bushing 16, which provides insulation and receives fastening force in the axial direction, is made of thermosetting resin such as phenol resin. Therefore, the creep under high ambient temperature and the loosening of nuts can be prevented. Moreover, inexpensive phenol resin can be used, and the bushing can be inert-molded in cover 11 to make assembling work easy.

Figure 5A:
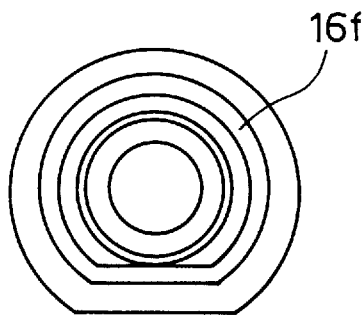
FIG. 5A is a front view illustrating a variant of the bushing.
Figure 5B:
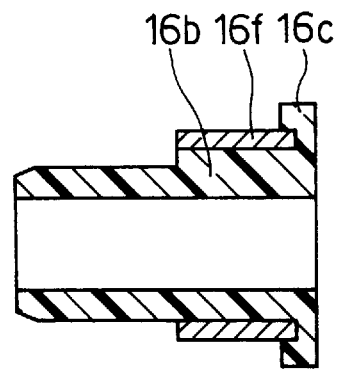
FIG. 5B is a cross-sectional view thereof.
Figure 6A:
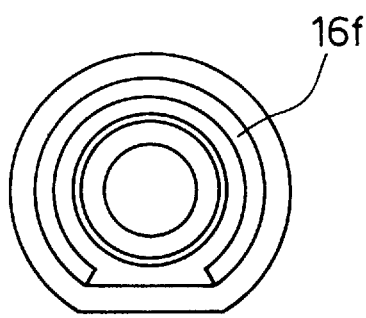
FIG. 6A is a front view illustrating another variant of the bushing.
Figure 6B:
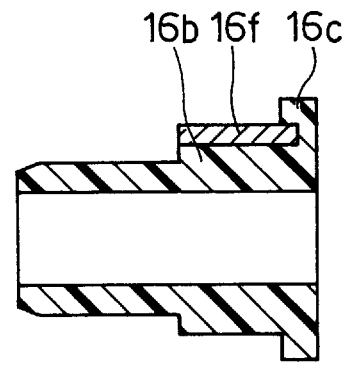
FIG. 6B is a cross-sectional view thereof.
Figure 7:
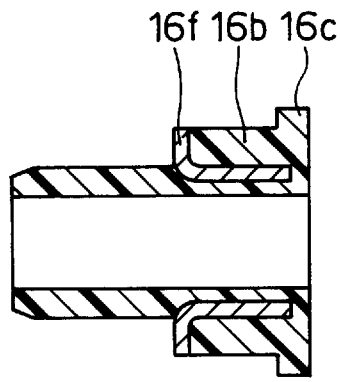
FIG. 7 is a cross-sectional view of another variant of the bushing.

Inner flange 16b can have semi-cylindrical metal member 16f on the periphery thereof as shown in FIG. 5. Metal member 16f can be inserted when bushing 16 is formed, or can be press-fitted after bushing is formed if it is provided with a shrink range. This strengthens the bushing in the axial direction, thereby preventing creep and bolt-loosening and increasing vibration resistance. This structure also prevents the bushing from cracking even if the nut is excessively tightened. Metal member 16f can be formed into a C-shape as shown in FIG. 6 or can have a flange to be in contact with plus fin 15 as shown in FIG. 7.

Second Embodiment

A plurality of projection members 16j for partially pressing plus fin 15 as shown in FIG. 8 can be substituted for the annular flange. This can reduce material for bushing 16.

Third Embodiment

As shown in FIG. 9, holes 16h of outer flange 16c and projections 11a of cover 11 can be fitted together and thermally bonded. It is possible to fix each other by soldering or adhesive agent. This can omit insert molding and simplify mold dies and the working process with inexpensive equipment. As far as the outer periphery is non-circular such as elliptic or polygonal, the rotation can be prevented. Even if the outer periphery is circular, the rotation can be prevented by a hole formed at a peripheral portion of outer flange 16c to be filled with resinous material when cover 11 is molded.

Fourth Embodiment

As shown in FIGS. 10A and 10B, a bushing that has only inner flange 16b can be applied if inner flange 16b has a sufficient surface area to support nut 108 and a rotation locking portion 16k is formed on the outer periphery of inner flange 16b.

Fifth Embodiment

Figure 11:
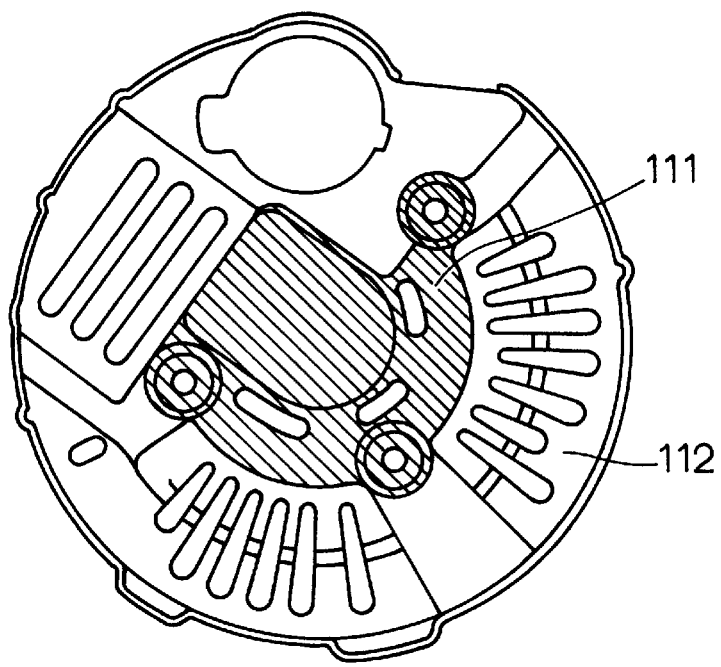
FIG. 11 is a front view illustrating a cover of a rectifier arrangement according to a fifth embodiment.
Figure 12:
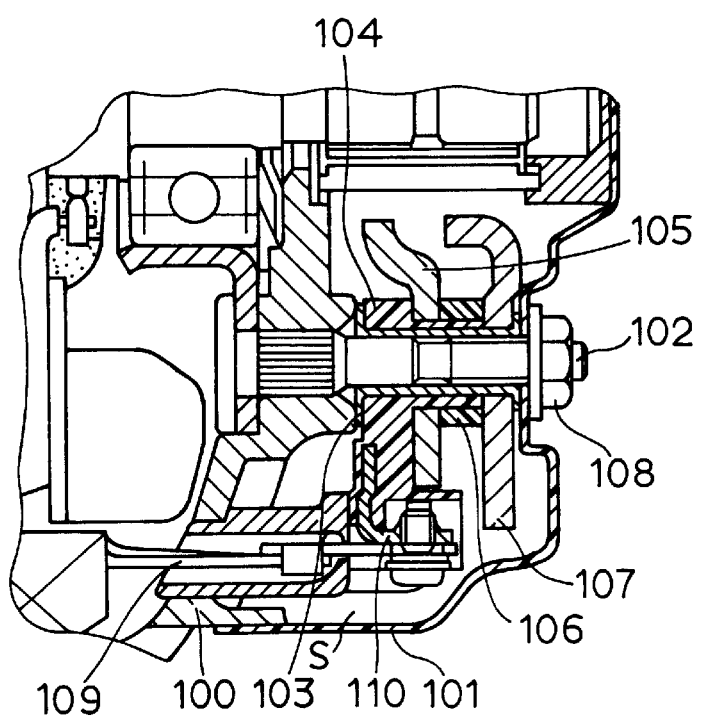
FIG. 12 is a cross-sectional view illustrating a portion around a conventional rectifier arrangement.

As shown in FIG. 11, a plurality of bushings 16 and a portion (sub-cover) 111 of cover 11 are integrally formed from thermosetting resin and is fixed together with the rest 112 of the cover. In this case, the positioning of bushings 16 can be carried out more precisely. Therefore, assembling error of cover 11 can be reduced. Moreover, a plurality of bushings 16 can be put together, and the number of parts and production cost can be reduced.

Bushing 16 and cover 11, altogether, can be formed from thermosetting resin, so that the number of parts and production steps can be reduced.

It is also possible that female screws are formed in frame 4 directly to have the bolts screwed therein. Thus, the number of parts and manufacturing steps can be reduced.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rectifier arrangement of an alternator for a vehicle including a frame and a cover fixed to said frame for covering said rectifier arrangement, said rectifier arrangement comprising:

a plus-potential cooling-fin having a mounting hole disposed in a space between said cover and said frame at a portion close to said cover;

a minus-potential cooling-fin having a mounting hole disposed in said space in contact with said frame and parallel with said plus-potential cooling-fin;

a fastening member, fixed to said frame and extending through said mounting holes of said plus-potential and minus-potential cooling fins, for fastening said cover, said plus-potential cooling-fin and said minus-potential cooling-fin; and a bushing made of thermosetting resin disposed in a space formed by said cover, said plus-potential cooling-fin and said fastening member to insulate said plus-potential cooling-fin from said fastening member;

wherein said cover is made of thermoplastic resin, and said bushing is integral with said cover.

2. The rectifier arrangement as claimed in claim 1, wherein said bushing has a flange having a surface in contact with said plus-potential cooling-fin, said flange has an outside diameter larger than a diameter of said mounting hole of said plus-potential cooling-fin.

3. The rectifier arrangement as claimed in claim 1, wherein an end surface of said bushing is exposed to the outside of said cover.

4. The rectifier arrangement as claimed in claim 3, wherein said end surface is larger in diameter than a diameter of contact surface of said fastening member.

5. The rectifier arrangement as claimed in claim 1, wherein said bushing has a cut portion to be locked by said cover.

6. A rectifier arrangement of an alternator for a vehicle including a frame and a cover fixed to said frame for covering said rectifier arrangement, said rectifier arrangement comprising:

a plus-potential cooling-fin having a mounting hole disposed in a space between said cover and said frame at a portion close to said cover;

a minus-potential cooling-fin having a mounting hole disposed in said space in contact with said frame and parallel with said plus-potential cooling-fin;

a fastening member, fixed to said frame and extending through said mounting holes of said plus-potential and minus-potential cooling fins, for fastening said cover, said plus-potential cooling-fin and said minus-potential cooling-fin;

a bushing made of thermosetting resin disposed in a space formed by said cover, said plus-potential cooling-fin and said fastening member to insulate said plus-potential cooling-fin from said fastening member; and wherein said cover comprises a member made of thermosetting resin and having said bushing integral therewith.

7. A rectifier arrangement of an alternator for a vehicle including a frame and a cover fixed to said frame for covering said rectifier arrangement, said rectifier arrangement comprising:

a plus-potential cooling-fin having a mounting hole disposed in a space between said cover and said frame at a portion close to said cover;

a minus-potential cooling-fin having a mounting hole disposed in said space in contact with said frame and in parallel with said plus-potential cooling-fin;

a fastening member, fixed to said frame and extending through, said mounting holes of said plus-potential cooling-fin and said minus-potential cooling-fin, for fastening said cover, said plus-potential cooling-fin and said minus-potential cooling-fin; and a bushing made of thermosetting resin disposed in a space formed by said cover, said plus-potential cooling-fin and said fastening member to insulate said plus-potential cooling-fin from said fastening member; and wherein said bushing and said cover are molded together with thermosetting resin.

8. A rectifier arrangement of an alternator for a vehicle including a frame and a cover fixed to said frame for covering said rectifier arrangement, said rectifier arrangement comprising:

a plus-potential cooling-fin having a mounting hole disposed in a space between said cover and said frame at a portion close to said cover;

a minus-potential cooling-fin having a mounting hole disposed in said space in contact with said frame and in parallel with said plus-potential cooling-fin;

a fastening member, fixed to said frame and extending through said mounting holes of said plus-potential cooling-fin and said minus-potential cooling fin, for fastening said cover, said plus-potential cooling-fin and said minus-potential cooling-fin; and a bushing made of thermosetting resin disposed in a space formed by said cover, said plus-potential cooling-fin and said fastening member to insulate said plus-potential cooling-fin from said fastening member; and wherein said bushing comprises a cylindrical metal member inserted therein.

* * * * *